United States Patent [19]

Reisenfeld

[11] Patent Number: 4,887,280
[45] Date of Patent: Dec. 12, 1989

[54] SYSTEM FOR DETECTING THE PRESENCE OF A SIGNAL OF A PARTICULAR DATA RATE

[75] Inventor: Sam Reisenfeld, Playa del Rey, Calif.
[73] Assignee: Hughes Aircraft Company, Los Angeles, Calif.
[21] Appl. No.: 947,256
[22] Filed: Dec. 29, 1986
[51] Int. Cl.$^4$ ............................................. H04L 23/00
[52] U.S. Cl. ...................... 375/121; 375/10; 455/226
[58] Field of Search .................... 375/121, 10; 370/84; 455/226

[56] References Cited

U.S. PATENT DOCUMENTS

| | | | |
|---|---|---|---|
| 4,479,253 | 10/1984 | Daniel, Jr. | 375/10 |
| 4,501,020 | 2/1985 | Wakeman | 375/10 |
| 4,584,710 | 4/1986 | Hansen | 455/226 |
| 4,597,107 | 6/1986 | Ready et al. | 455/226 |

FOREIGN PATENT DOCUMENTS

0201562  11/1984  Japan .................................... 375/121

Primary Examiner—Robert L. Griffin
Assistant Examiner—Marianne Huseman
Attorney, Agent, or Firm—Steven M. Mitchell; Wanda K. Denson-Low

[57] ABSTRACT

A multiple data rate detector which examines the power spectral density of the received signal and thereby determines whether the signal is wihtin one of N known data rate ranges. The invention includes a first filter, with a first passband and a second filter having a second distinct passband. First and second power detectors are provided for detecting the power associated with the output of the first and second filters. The outputs of the power detectors are compared to yield a signal indicative of the data rate.

17 Claims, 6 Drawing Sheets

SYSTEM FOR DETECTING THE PRESENCE OF A SIGNAL OF A PARTICULAR DATA RATE

BACKGROUND OF THE INVENTION

1. Field of the Invention:

The present invention relates to communication systems. More specifically, the present invention relates to coherent data communication systems employing multiple data rates.

While the invention is described herein with reference to illustrative embodiments for a particular application, it is understood that the invention is not limited thereto. Those of ordinary skill in the art will recognize additional embodiments and applications within the scope thereof.

2. Description of the Related Art:

In many digital communication systems, data is transmitted at one data rate for acquisition and a second data rate for communication. Typically, the first data rate is low to facilitate acquisition while the communication data rate is high. In other applications, three or more data rates may be employed.

Conventional multiple data rate communication systems utilize separate demodulators for each data rate transmitted. In some applications, it is desirable to minimize the number of modulators used for data communication. In noncoherent systems, i.e., those that do not utilize phase data to assist in the demodulation of a received signal, a separate tone or subcarrier frequency may be used to designate the data rate. Unfortunately, this approach is unsuitable for the power efficient coherent communication schemes.

For the power efficient coherent communication system, a single demodulator could be used if the data rate could be detected. Once so detected, the parameters, filters, switches, and etc. of the demodulator could be automatically adjusted to optimize the performance of the demodulator for the data rate being transmitted. Thus, the related art demonstrates a need for a multiple data rate detector for coherent communication systems.

SUMMARY

The need illustrated by the related art is addressed by the multiple data rate detector of the present invention which examines the power spectral density of the received signal and determines whether the signal is within one of N known data rate ranges. The receiver parameters may then be optimized on the basis of the data rate range determination.

The invention includes a first filter, with a first passband and a second filter having a second distinct passband. First and second power detectors are provided for detecting the power associated with the output of the first and second filters. The outputs of the power detectors are compared to yield a signal indicative of the data rate.

DESCRIPTION OF THE INVENTION

As disclosed herein, the present invention provides a multiple data rate detector which can be used with a coherent detection scheme. The invention examines the power spectral density of the received signal and determines whether the signal s within one of N known data rate ranges. The receiver parameters are then optimized on the basis of the data rate range determination.

In an illustrative QPSK (quadrature phase shift keyed) modulation system, the transmitted signal is of the form:

$$S(t) = K_1 \cos(W_o t + \phi) = K_1(\cos(W_o t)\cos(\phi) - \sin(W_o t)\sin(\phi)) \quad (1)$$

where $K_1$ = a constant
$W_o$ = carrier frequency and
$\phi$ = phase angle.

For any T second interval of time (i.e. for a time interval t between M and M+1 times T, where M is an integer), the phase angle $\phi$ takes on one of four phases, which are odd quarter multiples of the constant $\pi$: $(\pi)/4$, $3(\pi)/4$, $5(\pi)/4$ or $7(\pi)/4$ radians. Therefore, $$S(t) = K_2(D_o t) + D_Q \sin(W_o t)) \quad (2)$$

where $K_2$ = a constant
$D_I = \cos(\phi)$ and
$D_Q = -\sin(\phi)$.

As a function of the phase angle $\phi$, $D_I$ and $D_Q$ take on the following values:

| $\phi$ | $D_I$ | $D_Q$ |
|---|---|---|
| $(\pi)/4$ | 1 | −1 |
| $3(\pi)/4$ | −1 | −1 |
| $5(\pi)/4$ | −1 | 1 |
| $7(\pi)/4$ | 1 | 1 |

$D_I$ and $D_Q$ are the inphase and quadriphase data bits that are modulated onto the carrier. In order to recover $D_I$ and $D_Q$ from the received signal, $\cos(W_o t)$ and $\sin(W_o t)$ must first be recovered from the received signal $S(t)$. This function is performed by the carrier recovery loop 12 and the quadrature mixers and low pass filters 13 of the illustrative analog QPSK implementation of FIG. 1. The carrier recovery loop 12 and quadrature mixers and low pass filters 13 operate on the received input signal and provide I' and Q' baseband components. A typical carrier recovery loop 12 and quadrature mixer and low pass filter 13 are illustrated in greater detail in FIG. 2.

Figure 2:
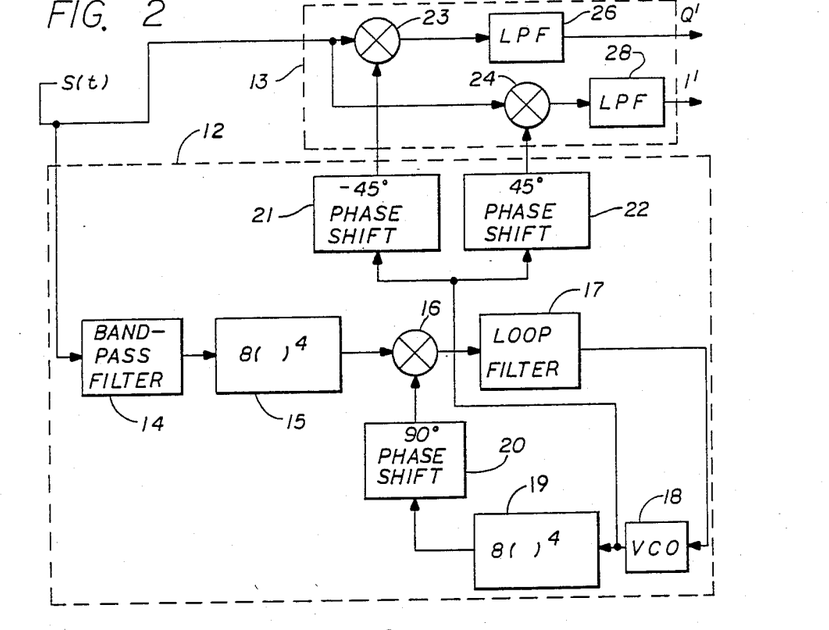
FIG. 2 is a more detailed illustration of a typical carrier recovery loop.

As shown in FIG. 2, the received input signal S(t) is filtered by a bandpass filter 14 and factored by 8 and raised to the fourth power by an $x^4$ nonlinearity 15. The $x^4$ nonlinearity 15 may be implemented by cascaded multipliers, or by other techniques, as is known in the art. The nonlinearity 15 provides a signal to a mixer 16 which includes no modulation. The output of the mixer 16 is input to a loop filter 17. The loop filter 17 is of the form of a low pass filter and provides the time dynamics of the loop. The loop filter 17 provides an input to a voltage controlled oscillator (VCO) 18 which generates the recovered carrier $W_o$. The VCO 18 output is powered by four and factored by eight by a second nonlinearity 19 then shifted in phase by a 90 degree phase shifter 20 before being input to the mixer 16 to complete the loop. The recovered carrier $W_o$ is output to a pair of positive and negative 45 degree phase shifters 21 and 22 to generate the coherent carriers and $\cos(W_o t)$ and $\sin(-W_o t)$ respectively.

Figure 3A:
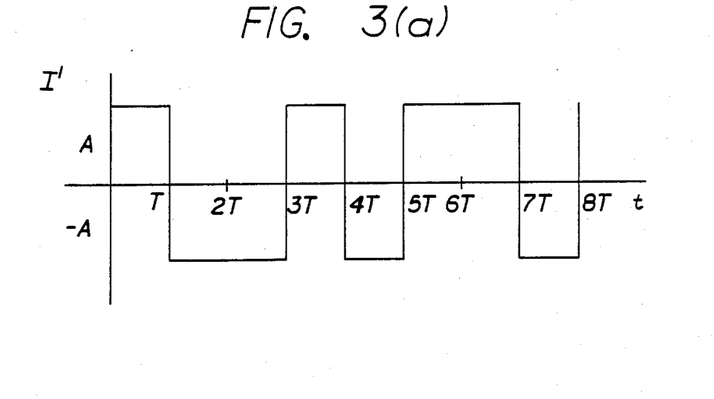
FIGS. 3(a) and 3(b) illustrate typical in-phase and quadrature signals used in the present invention respectively.
Figure 3B:
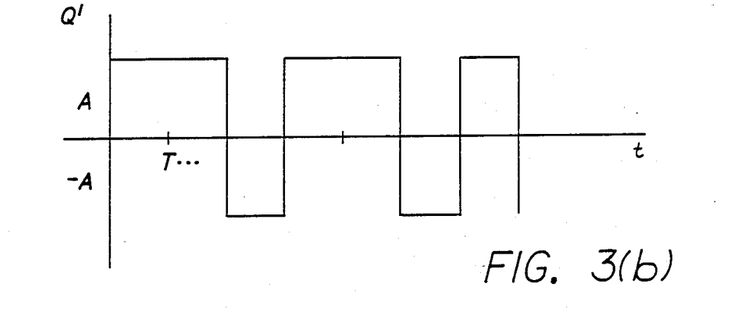

In the quadrature mixer and bandpass filter circuit 13, the coherent carriers are mixed with the received signal $S(t)$ by mixers 23 and 24 and low pass filtered by filters 26 and 28 to obtain the quadrature baseband signal components $I'$ and $Q'$ respectively where, $$I' = K_3 D_I \quad (2)$$

and $$Q' = K_3 D_Q \quad (3)$$

where $K_3 =$ is a constant and $D_I$ and $D_Q$ represent phase modulation. Typical representations of the $I'$ and $Q'$ signals are shown in FIGS. 3(a) and 3(b) respectively.

Returning now to FIG. 1, the $I'$ and $Q'$ components of the received signal $S(t)$ are input to first and second channels 30 and 32 for filtering and power detection in the manner taught by the present invention. The first channel 30 includes first and second low pass filters 34 and 36 for operating on the in-phase signal $I'$ and the quadrature signal $Q'$ respectively. The power in each signal is provided by squaring circuits (e.g., cascaded multipliers) 38 and 40 and a circuit 42 which provides the square root of the sum of the squares. The circuit 42 may be implemented by a nonlinear amplifier as is known in the art. The squaring circuits 38 and 40 and the circuit 42 thereby provide a power detector. The output of the circuit 42 is filtered by a low pass filter 44. The low pass filter 44 improves the signal-to-noise ratio prior to comparison.

Figure 1:
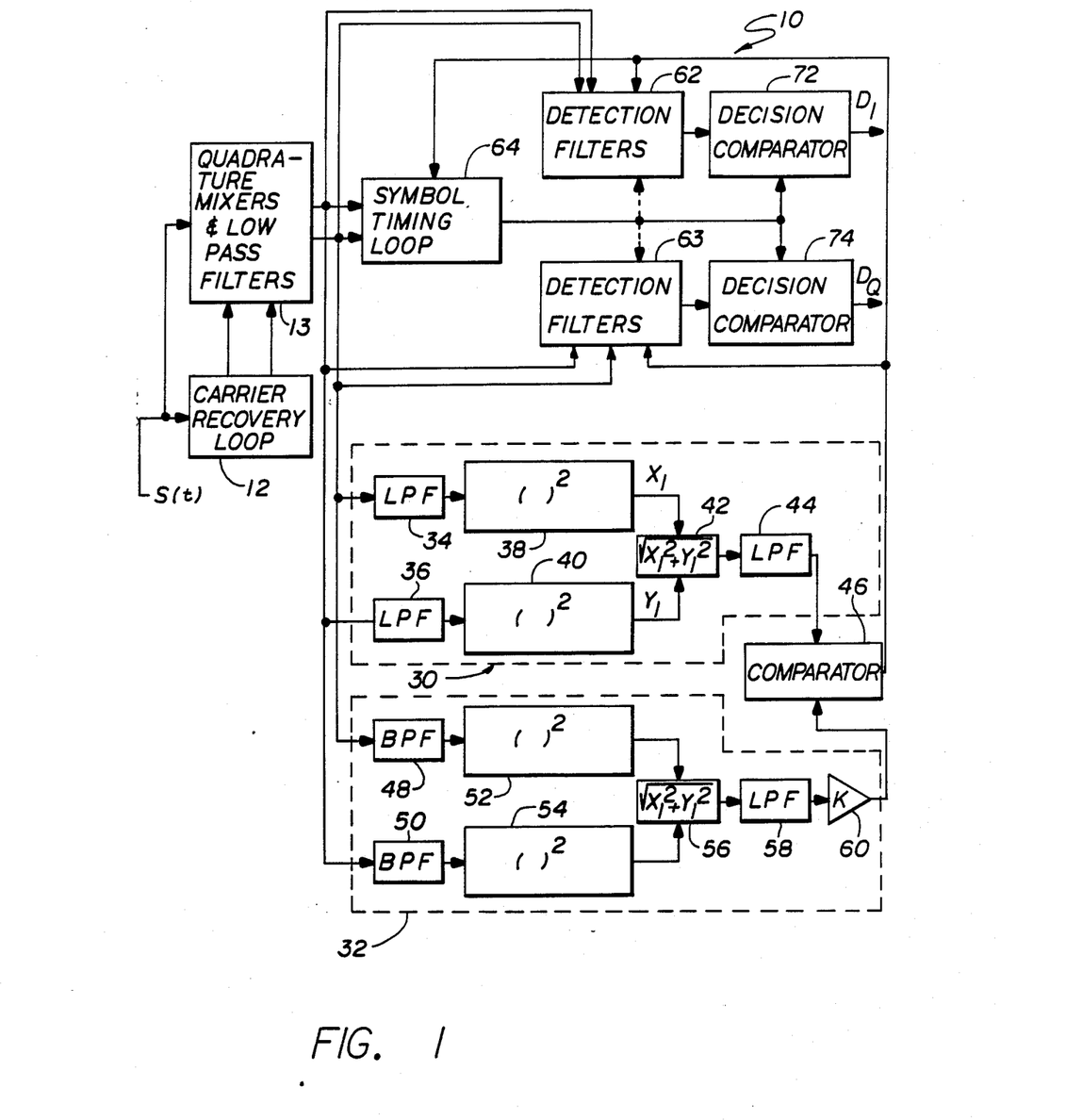
FIG. 1 is an analog implementation of the illustrative embodiment of the multiple data rate detector of the present invention.

The output of the low pass filter 44 is provided as a first input to a data rate decision comparator 46. The second input to the comparator 46 is provided by the second channel 32 which includes first and second bandpass filters 48 and 50 respectively. The first bandpass filter 48 operates on the $I'$ component and the second bandpass filter 50 operates on the $Q'$ component of the received signal. The power of each component in the passband of the bandpass filters 48 and 50 is measured by a second set of squaring circuits 52 and 54 and a circuit 56 which provides the square root of the sum of the squares of the baseband signals. A low pass filter 58 is provided to improve the signal-to-noise ratio of the second channel at the decision point. The output of the filter 58 is scaled by an amplifier 60 and provided as a second input to the analog comparator 46. Thus, the comparator 46 compares the power associated with the low passed representation of the $I'$ and $Q'$ signals to the power associated with the bandpassed representation of the same signals.

Figure 4A:
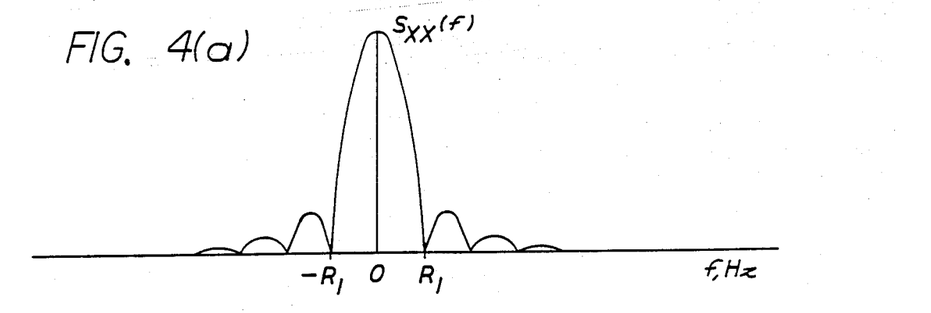
FIG. 4(a) shows the power spectral density of a typical signal having a low symbol data rate $R_1$.
Figure 4B:
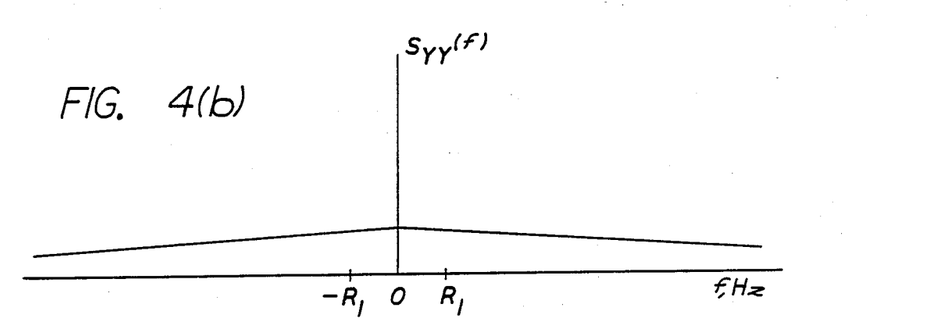
FIG. 4(b) shows the power spectral density of a typical signal having a second much higher symbol data rate $R_2$.
Figure 4C:
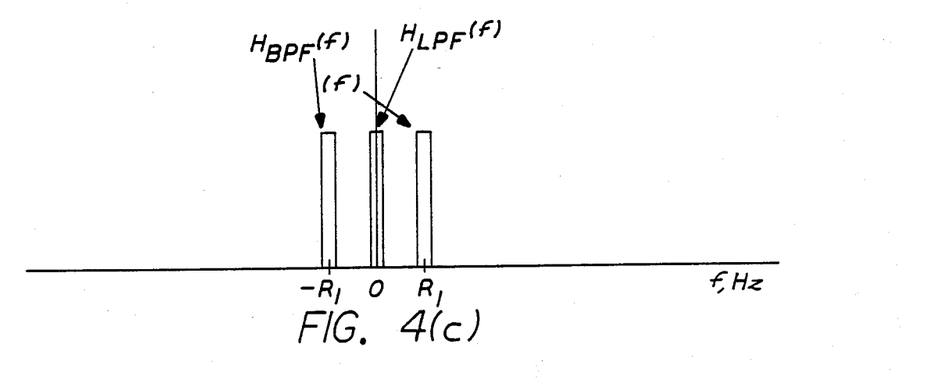
FIG. 4(c) shows the power spectral density of the low pass and bandpass filter.

The operation of the invention is best explained at this point with reference to FIGS. 4(a)-4(c). FIG. 4(a) shows a typical power spectral density function $S_{xx}(f)$ of a first signal having a first symbol rate $R_1$. FIG. 4(b) shows the power spectral density $S_{yy}(f)$ of a second signal having a second symbol rate $R_2$ which is much much greater than $R_1$. That is, $R_2 >> R_1$.

Note that the first signal $S_{xx}(f)$ has spectral nulls at $+R_1$ and $-R_1$. The spectral nulls and higher order lobes of the second signal are not shown in FIG. 4(b) to demonstrate that they are substantially outside the bandwidth of the first signal $S_{xx}(f)$. The power spectral density of the transfer function $H_{LPF}(f)$ of the low pass filters 34 and 36 and the power spectral density of the transfer function $H_{BPF}(f)$ of the bandpass filters 48 and 50 are shown in FIG. 4(c). Note that the transfer function of the bandpass filters is centered around $-R_1$ and $+R_1$.

When the filters operate on a received signal $S(t)$ having a data rate of $R_1$ or $R_2$ the data rate is determined by comparing the output power of the low pass filters 34 and 36 to that of the bandpass filters 48 and 50. That is, if the data rate of the input signal $S(t)$ is $R_1$, then the output power of the low pass filters 34 and 36 is much much higher than that of the bandpass filters 48 and 50. Similarly, if the data rate of the input signal $S(t)$ is $R_2$, the output powers o the low pass filters 34 and 36 and that of the bandpass filters 48 and 50 are approximately equal. Thus, the comparator 46 need only provide an output which signals whether its inputs are substantially equal (say a logical '0') or substantially different (say a logical '1'). One of ordinary skill in the art will recognize that N known data rates may be so detected by the provision of N detection channels in accordance with the teachings of the present invention. The output of the comparator 46 thus provides an indication of the symbol data rate to detection filters 62 and 63 and a symbol timing loop 64.

The detection filters 62 and 63 receive the $I'$ and $Q'$ signals respectively from the carrier recovery loop 12 and integrate the signals over the symbol period to minimize noise and improve the performance of the system. (The symbol period is the reciprocal of the symbol rate.)

Figure 5:
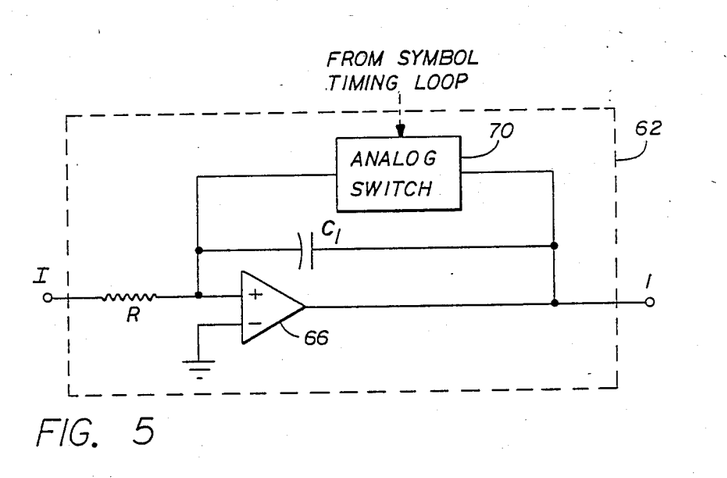
FIG. 5 illustrates in detail a typical implementation of a detection filter.

A typical integrate and dump implementation of a detection filter is shown in greater detail in FIG. 5. Each filter may be implemented by operational amplifiers as an integrate and dump filter as is known in the art. Thus, and as shown in FIG. 5, the filter may include an operational amplifier 66 having an input resistor R, a capacitor $C_1$ in a feedback loop, and a second feedback loop with an analog switch 70. The analog switch 70 operates under control of the symbol timing loop 64 to reset or dump the integrator (detection filter) 62 at the symbol rate. Those of ordinary skill in the art will recognize that low pass filters may be used instead of the integrate and dump filters to implement the detection filters 62 and 63 for high speed applications where a slight performance degradation may be tolerated. The data rate mode signal would not be required for the integrate and dump filter implementation but might be required for a low pass filter implementation. Hence, the line is shown broken to indicate that it would be optional and dependent on the manner in which the detection filter is implemented. That is, for the low pass filter implementation, the data rate mode control signal could be used, for example, to control the selection of the filter bandwidth used for detection as a function of the detected symbol rate.

Figure 6:
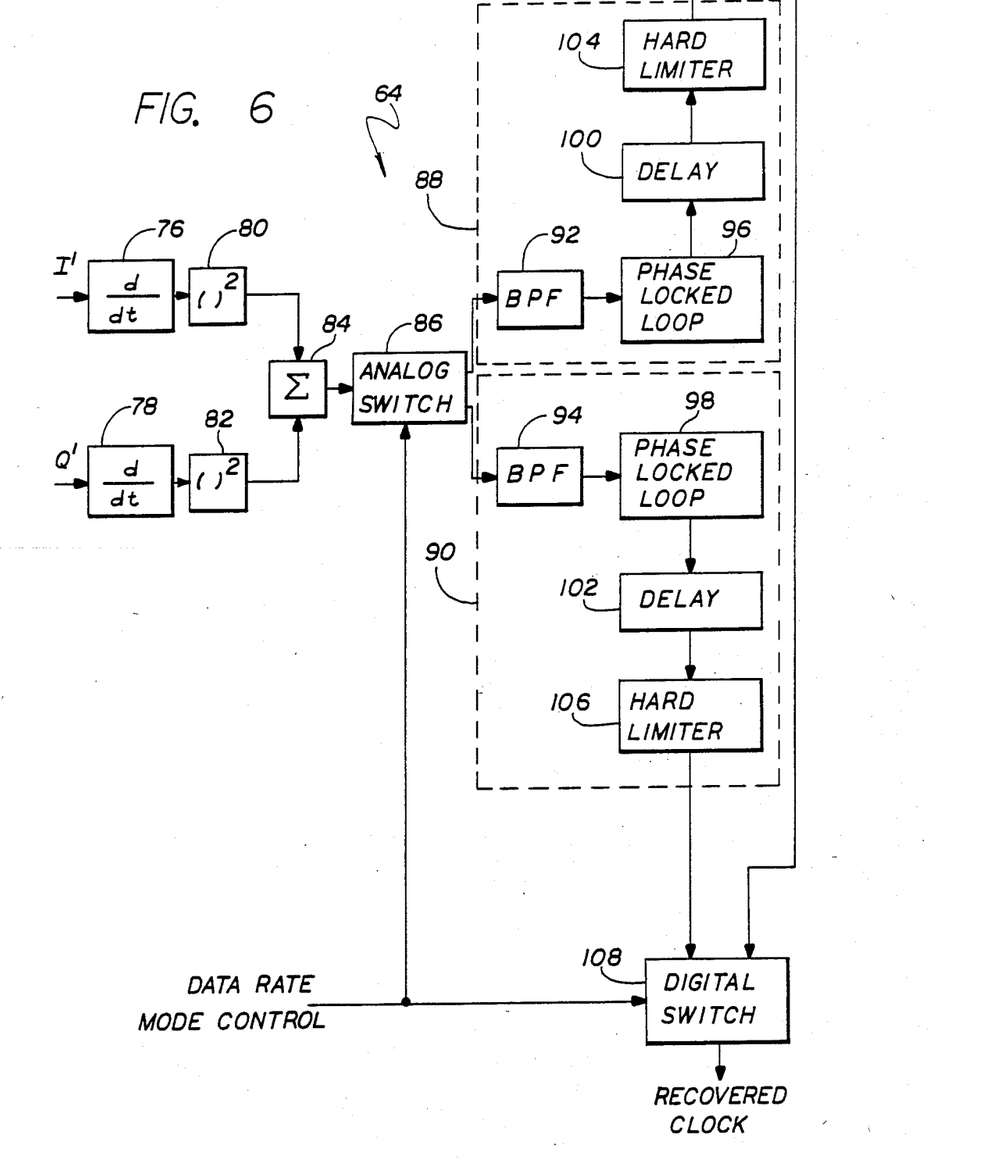
FIG. 6 provides a detailed diagramatic representation of an illustrative symbol timing loop.

For detection of $D_I$ and $D_Q$, symbol timing must be recovered from S(t) by the symbol loop 64. The symbol timing loop 64 locks on to the symbol rate and provides the timing signal to the detection filters 62 and 63. An illustrative implementation of an adaptive symbol timing loop 64 is shown in FIG. 6. The symbol timing loop 64 includes dual differentiators 76 and 78 which detect the edges of the input pulses and provide corresponding positive and negative pulses representative of the symbol transitions. The squaring circuits 80 and 82 transform the negative pulses from the differentiators 76 and 78 to positive pulses. The summing circuit 84 sums signals representing both the I' and Q' inputs to generate the strongest frequency component at the symbol rate. The output of the summing circuit 84 is switched by an analog switch 86 under control of the data rate mode control signal from the comparator 46. That is, the data rate mode control signal switches the summed signal into one of two channels 88 and 90 depending on the detected symbol rate. The channels 88 and 90 are substantially identical. Each channel 88 or 90 includes a bandpass filter 92 o 94 which has a center frequency at one of the symbol rates $R_1$ or $R_2$ respectively. Thus, if the lower symbol rate $R_1$ is detected, energy at and near the frequency of $R_1$ in the summed signal is input to a phase locked loop 96 having a center frequency $R_1$ which provides flywheel continuity of the recovered clock signal when the density of the signal transitions is low. Similarly, the second channel 90 has a phase locked loop 98 having a center frequency $R_2$. The outputs of the phase locked loops 96 and 98 are delayed yy circuits 100 and 102 respectively to synchronize the recovered clock signal thus generated with the received signal. Hard limiters 104 and 106 square the clock pulses. The channel outputs are chosen by a digital switch 108 operating under control of the data rate mode control line from the decision rate comparator 46. The digital switch 108 may be replaced by a summing circuit as is known in the art.

Figure 3C:
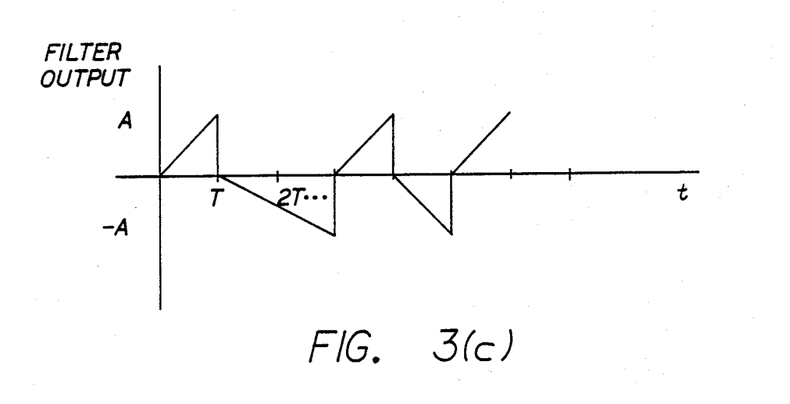
FIG. 3(c) illustrates the output of an a detection filter operating on the in-phase signal of FIG. 3(a).

The output of the filter integrator 62 or 63 is shown in FIG. 3(c). The output of the integrator will grow toward +A or −A until the integrator (detection filter 62 or 63) is reset by the symbol timing loop 64. As shown in FIG. 1, a set of decision comparators 72 and 74 compare the state of the filter 62 and 63 outputs to zero and thereby extract the modulated signal from I' and Q'. In a QPSK implementation, the I' comparator 72 provides a logical '0' or '1' output while the Q' comparator 74 similarly provides a logical '0' or '1' output. Thus, the four possible combinations of decision comparator outputs (00, 01, 10, and 11) provide the four possible states of a QPSK signal. The decision comparator outputs may be input to a conventional data processor (not shown).

Figure 7:
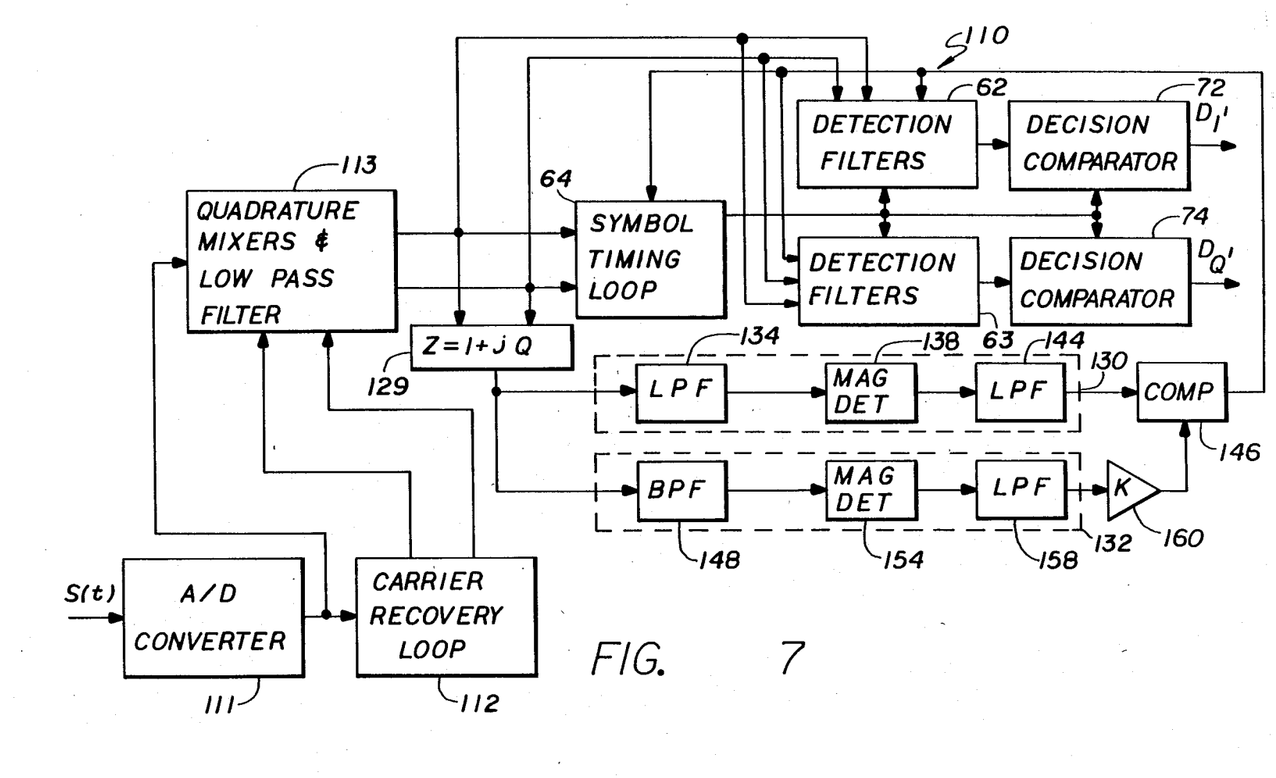
FIG. 7 shows an alternative digital implementation of the multiple data rate detector of the present invention.

A digital implementation of the invention 110 is shown in the alternative embodiment of FIG. 7. The digital implementation is functionally equivalent to the analog implementation with the exception that each component is implemented with digital hardware. Thus, for example, an A/D convertor 111 is provided to digitize the received signal prior to the carrier recovery loop 112. The carrier recovery loop 112 would be functionally equivalent to that of FIG. 1. All that is required is that the carrier recovery loop 112 provide time sampled discrete amplitude digitized pre-detection signals to the low pass and bandpass filter channels 130 and 132 which treat the digitized I' and Q' signals as a complex number. In the digital implementation of FIG. 7, a register 129 is provided to store the digitized I' and Q' samples as a complex number with the the I' samples providing the real component and the Q' samples providing the imaginary component. The low pass filter 134 and the bandpass filter 148 may be realized with infinite impulse response or finite impulse response filters as is known in the art. The magnitude detectors 138 and 154 compute the square root of the sum of the squares of the digitized in-phase and quadrature signals. A set of low pass filters 144 and 158 are provided to improve the signal-to-noise ratio at the decision point. The scaling amplifier 160 may be implemented with digital multiplier. The operation of the digital implementation is essentially the same as that of the analog embodiment of FIG. 1.

Thus, the invention has been described with reference to illustrative embodiments for a particular application. It is understood that other modifications, applications and embodiments may be made by those skilled in the art within the scope of the teachings provided herein. For example, the invention is not limited to any particular coherent modulation scheme. Nor is the invention limited to two distinct data rates. The teachings of the invention may be applied to a communications system with N known data rates. Further, the invention is not limited to any particular technique for low pass and bandpass filtering the in-phase and quadrature signals, nor to any particular technique for measuring and detecting the power in the output of the filters. It is therefore intended by the appended claims to cover any and all such modifications, applications and embodiments.

Thus, what is claimed is:

1. In a system for receiving a communication signal of known possible data rates, a system for detecting the presence of a signal of a particular data rate by detecting the energy distribution of said received signal comprising:

first filter means, having a first passband for filtering said received communication signal and providing a first filtered signal;

second filter means, having a second passband distinct from said first passband, for filtering said received communication signal and providing a second filtered signal;

first envelope detector means for detecting the power associated with said first filtered signal and providing an output indicative thereof;

second envelope detector means for detecting the power associated with said second filtered signal and providing an output indicative thereof; and comparator means for comparing the output of said first envelope detector means to that of said second envelope detector means and for providing an output signal indicative thereof.

2. The invention of claim 1 wherein said first filter means is a low pass filter.

3. The invention of claim 2 wherein said second filter means is a bandpass filter.

4. In a system for receiving a communication signal including a carrier signal modulated by signals of known possible data rates, a system for detecting the presence of a signal of a particular data rate by detecting the energy distribution of said received signal comprising:

carrier recovery loop means for extracting a carrier signal from said received communication signal and providing first and second modulation signals therefrom;

first filter means, having a first bandpass for filtering said first and second modulation signals and providing a first filtered signal;

second filter means, having a second passband distinct from said first passband, for filtering said first and second modulation signals and providing a second filtered signal;

first envelope detector means for detecting the power associated with said first filtered signal and providing an output indicative thereof;

second envelope detector means for detecting the power associated with said second filtered signal and providing an output indicative thereof; and comparator means for comparing the output of said first envelope detector means to that of said second envelope detector means and for providing an output signal indicative thereof.

5. The invention of claim 4 wherein said first filter means includes first and second low pass filters for filtering said first and second modulation signals respectively.

6. The invention of claim 5 wherein said second filter means includes first and second bandpass filters for filtering said first and second modulation signals respectively.

7. The invention of claim 6 including first means for summing the output of said first and second low pass filters.

8. The invention of claim 7 including second means for summing the output of said first and second bandpass filters.

9. The invention of claim 8 including means for integrating the received communication signal in response to the output of said comparator means.

10. The invention of claim 9 wherein said means for integrating the received communication signal includes a detection filter and a timing loop.

11. The invention of claim 10 wherein said detection filter includes low pass filter means.

12. The invention of claim 11 wherein said low pass filter means includes a variable bandwidth low pass filter.

13. The invention of claim 12 wherein said timing loop includes a voltage controlled oscillator.

14. The invention of claim 9 wherein said means for integrating the received communication signal includes an integrate and dump filter and a timing loop.

15. The invention of claim 14 wherein said integrate and dump filter includes an integrator and an analog switch responsive to said timing loop.

16. In a system for receiving a communication signal of N known possible data rates, a system for detecting the presence of a signal of a particular data rate by detecting the energy distribution of said received signal including:

first filter means, having a first passband for filtering said received communication signal and providing a first filtered signal;

second filter means, having a second passband distinct from said first passband, for filtering said received communication signal and providing a second filtered signal;

first envelope detector means for detecting the power associated with said first filtered signal and providing an output indicative thereof;

second envelope detector means for detecting the power associated with said second filtered signal and providing an output indicative thereof;

comparator means for comparing the output of said first envelope detector means to that of said second envelope detector means and for providing an output signal indicative thereof; and means for integrating the received communication signal in response to the output of said comparator means.

17. In a system for receiving a communication signal of known possible data rates, a method of detecting the presence of a signal of a particular data rate by detecting the energy distribution of said received signal including the steps of:

(a) filtering said received communication signal with a first filter having a first passband to provide a first filtered signal;

(b) filtering said received communication signal with a second filter having a second passband distinct from said first passband to provide a second filtered signal;

(c) detecting the power associated with said first filtered signal and providing an output indicative thereof;

(d) detecting the power associated with said second filtered signal and providing an output indicative thereof; and (e) comparing the power associated with said first filtered signal with the power associated with said second filtered signal and for providing an output signal indicative thereof.

* * * * *